US008111368B2

(12) United States Patent
Liu et al.

(10) Patent No.: US 8,111,368 B2
(45) Date of Patent: Feb. 7, 2012

(54) LIQUID CRYSTAL DISPLAY

(75) Inventors: Qin Liu, Corvallis, OR (US); Alan R. Arthur, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 951 days.

(21) Appl. No.: 11/364,760

(22) Filed: Feb. 28, 2006

(65) Prior Publication Data
US 2007/0200996 A1 Aug. 30, 2007

(51) Int. Cl.
*G02F 1/1339* (2006.01)
(52) U.S. Cl. .................................. 349/153; 349/190
(58) Field of Classification Search .................. 349/155, 349/156
See application file for complete search history.

(56) References Cited

U.S. PATENT DOCUMENTS

| | | | | |
|---|---|---|---|---|
| 5,307,190 A | * | 4/1994 | Wakita et al. | 349/158 |
| 5,545,280 A | * | 8/1996 | Wenz | 156/234 |
| 5,643,471 A | * | 7/1997 | Onishi et al. | 216/23 |
| 5,956,112 A | | 9/1999 | Fujimori et al. | |
| 6,166,797 A | * | 12/2000 | Bruzzone et al. | 349/155 |
| 6,312,546 B1 | * | 11/2001 | Bannister et al. | 156/230 |
| 6,337,730 B1 | * | 1/2002 | Ozaki et al. | 349/156 |
| 6,483,498 B1 | * | 11/2002 | Colgan et al. | 345/173 |
| 6,727,970 B2 | * | 4/2004 | Grace et al. | 349/187 |
| 6,798,481 B2 | * | 9/2004 | Kitson et al. | 349/129 |
| 6,865,012 B2 | | 3/2005 | Liang et al. | |
| 7,182,830 B2 | * | 2/2007 | Liang et al. | 156/292 |
| 2001/0026340 A1 | * | 10/2001 | Hasegawa et al. | 349/123 |
| 2003/0001999 A1 | * | 1/2003 | Kim et al. | 349/139 |
| 2003/0035885 A1 | | 2/2003 | Zang et al. | |
| 2004/0169913 A1 | | 9/2004 | Chen et al. | |
| 2004/0196215 A1 | | 10/2004 | Duthaler et al. | |
| 2004/0262402 A1 | | 12/2004 | Wilderbeek et al. | |
| 2005/0036096 A1 | * | 2/2005 | Takatori et al. | 349/156 |
| 2005/0196584 A1 | | 9/2005 | Halecki et al. | |
| 2005/0243229 A1 | * | 11/2005 | Akiyama et al. | 349/42 |
| 2006/0072063 A1 | | 4/2006 | Kim et al. | |
| 2010/0073613 A1 | * | 3/2010 | Yamada et al. | 349/110 |

FOREIGN PATENT DOCUMENTS

EP 1 139 153 A1 10/2001
JP 2004-287058 A 10/2004

OTHER PUBLICATIONS

Machine translation of JP 2004-287058, reference made of record by the applicant.*
Chiu et al, "Nanoimprinting-lithography-induced self-aligned liquid crystals for novel multifunctional optical films", Appl Phy Ltr, V 88(7), Feb. 16, 2006.
Allen et al, "Nanomaterial transfer using hot embossing for flexible electronic devices" Appl. Phys Ltr, V88(8), Feb. 23, 2006.
Yeun-Tae et al, "Alignment layerless flexible liquid crystal display fabricated by an imprinting technique at ambient temperatures", Appl Phy Ltr, V 89(17), Oct. 23, 2006.
Komvopoulos et al, "A Fractal Analysis of Stiction in Microelectromechanical Systems", Jrnl of Tribology, ASME, V 119(3), Jul. 1997.

* cited by examiner

*Primary Examiner* — Mark Robinson
*Assistant Examiner* — Mary El Shammaa

(57) ABSTRACT

Exemplary methods and apparatus are provided herein related to display systems. According to one exemplary embodiment, a method of forming a display is discussed that includes providing an embossable material and embossing the embossable material to form a plurality of features including at least one geometric adhesive portion.

14 Claims, 4 Drawing Sheets

LIQUID CRYSTAL DISPLAY

BACKGROUND

In recent years, portable devices have become increasingly popular. More and more of these devices make use of displays. Significant efforts have been devoted to increasing the overall quality of images generated by these displays while decreasing the overall size of the device. One approach makes use of liquid crystals to generate an image.

Liquid crystal displays frequently make use of a liquid crystal material located between two opposing plates. The liquid crystal selectively transmits or blocks light incident thereon depending on the orientation of the liquid crystal molecules. The orientation of liquid crystal molecules may be controlled by selectively applying an electrical field to a given location of the liquid crystal across the two plates. By controlling the orientation of the liquid crystal across the entire display, light directed thereto may be selectively transmitted or blocked to thereby form an image.

One concern present in many devices is battery life. Thus, efforts have been directed to reducing the power consumption of portable devices in order to decrease the power consumption and thus increase the battery lifetime, which may ultimately affect the portability of such a device. One type of liquid crystal display makes use of a configuration that has a single stable state in the absence of an electric field. Thus, in order to continuously generate an image, the liquid crystal orientation is frequently refreshed. Frequent refreshing of the electric field applied to the liquid crystal consumes power. The general aim of current research is to reduce the power applied to the LCD. Many different areas of research have sprung up to tackle these problems and several devices have been created with varying degrees of effectiveness and success. One type of device, which can give significant reduction in power consumption, is the bi-stable display.

Many polymer materials have been used as adhesives in various industries. However, such adhesives may not function well if applied when the surfaces are wet with water or other liquids. One particularly demanding situation is in the cell assembly of flexible displays. For large-area displays, "adhesive dots" are needed in the middle portion of the display to maintain cell gap. As these adhesive dots are in the middle of the display, they need to be as small as possible to minimize dead area and defects; their area needs to be consistent and uniform throughout the display. In the case of liquid crystal displays, including bi-stable displays, the adhesive in the adhesive dots should not leach out in the presence of or be attacked by liquid crystals. Additionally, it may be desirable to form the bond in the presence of liquid crystals.

SUMMARY

A method of forming a display includes providing an embossable material; and embossing the embossable material to form a plurality of features including at least one geometric adhesive portion.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Geometric adhesives are provided herein for use in several applications, including displays and display systems. The use of geometric adhesives allows small, consistent, and pre-defined areas of contact between opposing surfaces. Further, geometric adhesives may be formed at a well-defined and uniform height. The geometric adhesives reduce the possibility that the bond between the two surfaces will be degraded by the presence of liquids, such as liquid crystal during a bonding process. Further, the geometric adhesives allow for the separate optimization of material compatibility such as not leaching or being attacked by the surrounding liquid environment and mechanical properties. Further, geometric adhesives may be used alone or in combination with more typically utilized dispensed or preformed adhesives. The use of geometric adhesives may also reduce the dispensing and curing of adhesives in the presence of another liquid, such as liquid crystal. This in turn reduces the possibility the liquid crystal may become contaminated or that bubbles will be generated within the cell during the bonding process.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
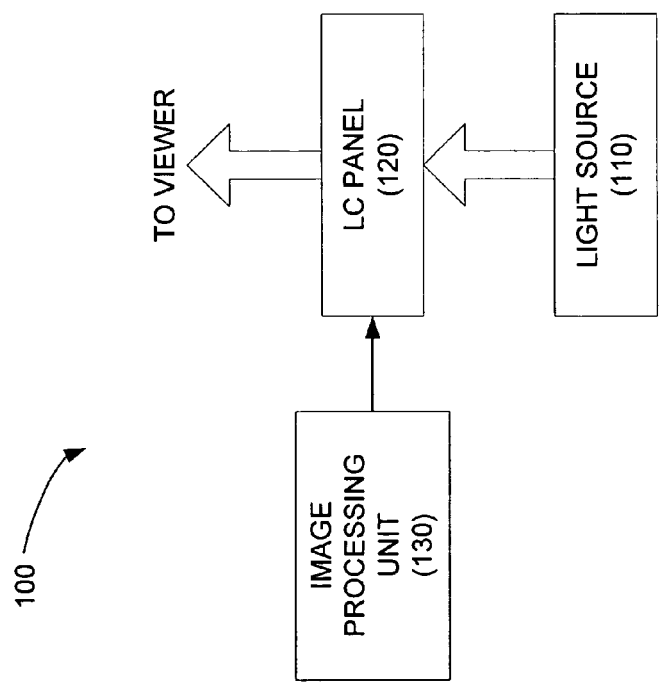
FIG. 1 illustrates a schematic view of a display system according to one exemplary embodiment.

FIG. 1 illustrates a schematic view of a display system (100). The display system (100) generally includes a light source (110), a liquid crystal (LC) panel (120), and image processing unit (130). The light source (110) generates light. The light may be any type of light. For example, according to one exemplary embodiment, the light source (110) is configured to generate broad-spectrum light. According to other exemplary embodiments, the light source (110) generates sequentially color-varying light. Color-varying light may be switched between several colors, such as sequentially switching between red, blue, and green light. In any case, light generated by the light source (110) is directed to the LC panel (120).

While one type of light source is described (110), those of skill in the art will appreciate that geometric adhesives may be applied to other types of display systems, including reflective, emissive, or other transmissive types of displays. Further, while reference will be made to one particular bonding configuration, those of skill in the art will appreciate that other types of bonding configurations are possible.

Selected portions of the LC panel are activated by the application of an electrical field or charge in that region. For example, according to one exemplary embodiment, the image processing unit controls the operation within the LC panel (120). In particular, the LC panel (120) may include an array of bi-stable regions. The image processing unit (130) selectively activates individual regions depending on their location in the array to form an image. More specifically, each region either transmits or blocks light incident thereon depending on the activation state of the cell.

According to one exemplary embodiment, one or more of the cells may be a bi-stable LC cell. Bi-stable LC cells may be switched between two or more stable phases. For example, one state may correspond to a transmission state and a second state may correspond to a blocking or non-transmission state. In a transmission state, the LC cell transmits light incident thereon while in a non-transmission state the LC cell blocks the transmission of light. By selectively controlling the transmission or non-transmission of each region of the LC panel (120), the LC panel is thus able to produce an image.

As will be discussed in more detail below, the LC panel may include opposing surfaces separated by a gap or space. The surfaces may be secured together with a geometric adhesive. For ease of reference, a geometric adhesive shall be broadly understood to mean a microstructure or group of microstructures that are bonded to one or more objects or surfaces by capillary and/or Van der Waal forces.

The use of geometric adhesives allows small, consistent, and predefined areas of contact between opposing surfaces. Further, a geometric adhesive may be formed with a well-defined and uniform height. The geometric adhesive reduces the possibility that the bond between the two surfaces will be degraded by the presence of liquids, such as liquid crystal during a bonding process. Further, the geometric adhesive allows for the separate optimization of material compatibility such as not leaching or being attacked by the surrounding liquid environment and mechanical properties. It does not require alignment. It also eliminates dispensing and curing of adhesives in the presence of another liquid, such as liquid crystal. This in turn reduces the possibility that the liquid crystal may become contaminated or that bubbles will be generated within the cell during the bonding process.

Method of Forming Liquid Crystal Displays

Figure 2:
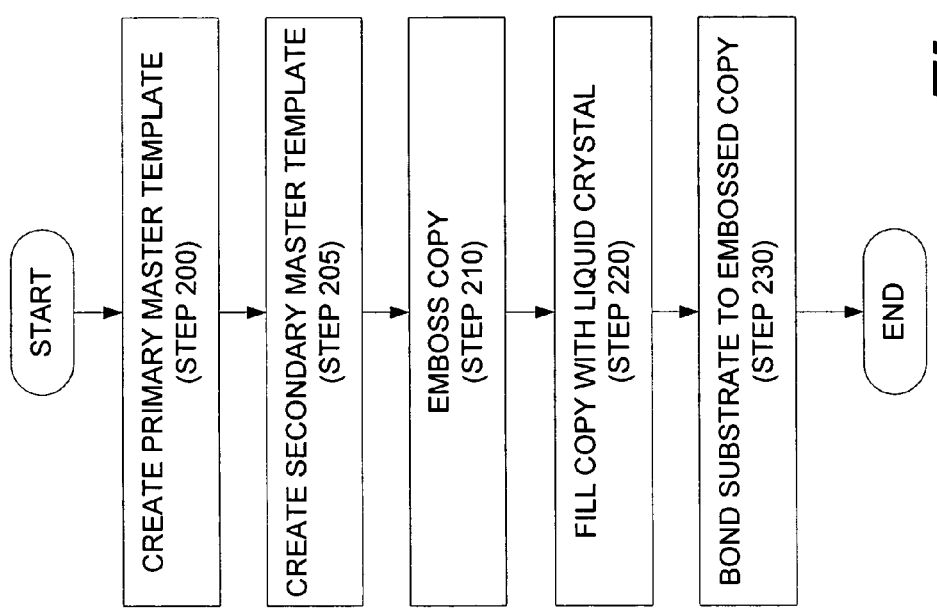
FIG. 2 is a flowchart illustrating a method of forming a display device according to one exemplary embodiment.

FIG. 2 is a flowchart illustrating a method of forming a liquid crystal display according to one exemplary embodiment. The method begins by creating a primary master template (step 200). The primary master template may be created using any suitable process. Suitable processes may include, without limitation, lithography methods such as a traditional photolithography processes, an e-beam lithography process, X-ray lithography processes, and/or laser processes. While one type of master template is discussed herein, those of skill in the art will appreciate that a master template may be generated to produce any combination of features that includes geometric adhesives. The primary master template may then be used to create a secondary master template (step 205). The secondary master template is configured to reliably and accurately reproduce copies having desired features.

According to one exemplary embodiment, the primary master template is configured to produce a pattern of features through an embossing process. These features may include components of an LC panel, such as a flexible LC display. In particular, according to one exemplary method, the master template may be configured to produce posts, spacers, and/or geometric adhesives used in flexible displays, such as post aligned bi-stable nematic (PABN) LC displays.

Continuing with FIG. 2, the secondary master template is used to emboss a copy (step 210). For example, an embossable material may be applied to a substrate, such as through spin casting, doctor blading, or any other suitable coating process. Suitable embossable materials may generally include, without limitation, UV curable materials. Any suitable substrate may be used. For example, according to one exemplary method, the substrate may include a flexible substrate, such as a clear plastic substrate. Other types of substrates may also be provided. Once the embossable material is applied to the substrate, the secondary template may be pressed into the embossable material to thereby create an embossed copy in the embossable material. Thereafter, the embossed copy may be fixed. For example, if UV curable material is used, UV light may be applied to the embossed copy to cure the UV curable material and thereby fix the embossed copy.

The embossed copy may then be filled with liquid crystal (step 220). As introduced, each embossed copy includes geometric adhesive portions formed therein. A second substrate may then be bonded to the embossed copy having the geometric adhesive structures (step 230), thereby sealing the liquid crystal panel. As previously discussed, the geometric adhesive may function due to capillary forces under wet conditions and due to van der Waals forces under dry conditions. Accordingly, the geometric adhesive provides reliable bonding under many conditions, such as when the parts are assembled in the presence of liquid crystal.

The present process describes the formation of a display with geometric adhesive patterns located throughout the display area of the device. Such a layer may be generally referred to as an image formation layer. Those of skill in the art will appreciate that templates may be created and used to emboss geometric layers into other portions of a display device. For example, it may be desirable to form geometric adhesives on other parts of the device, such as on a circuitry layer or other layer, which may then be bonded via the geometric adhesive portions to other parts of the device.

Post-Aligned Bi-Stable Nematic Liquid Crystal Display

Figure 3:
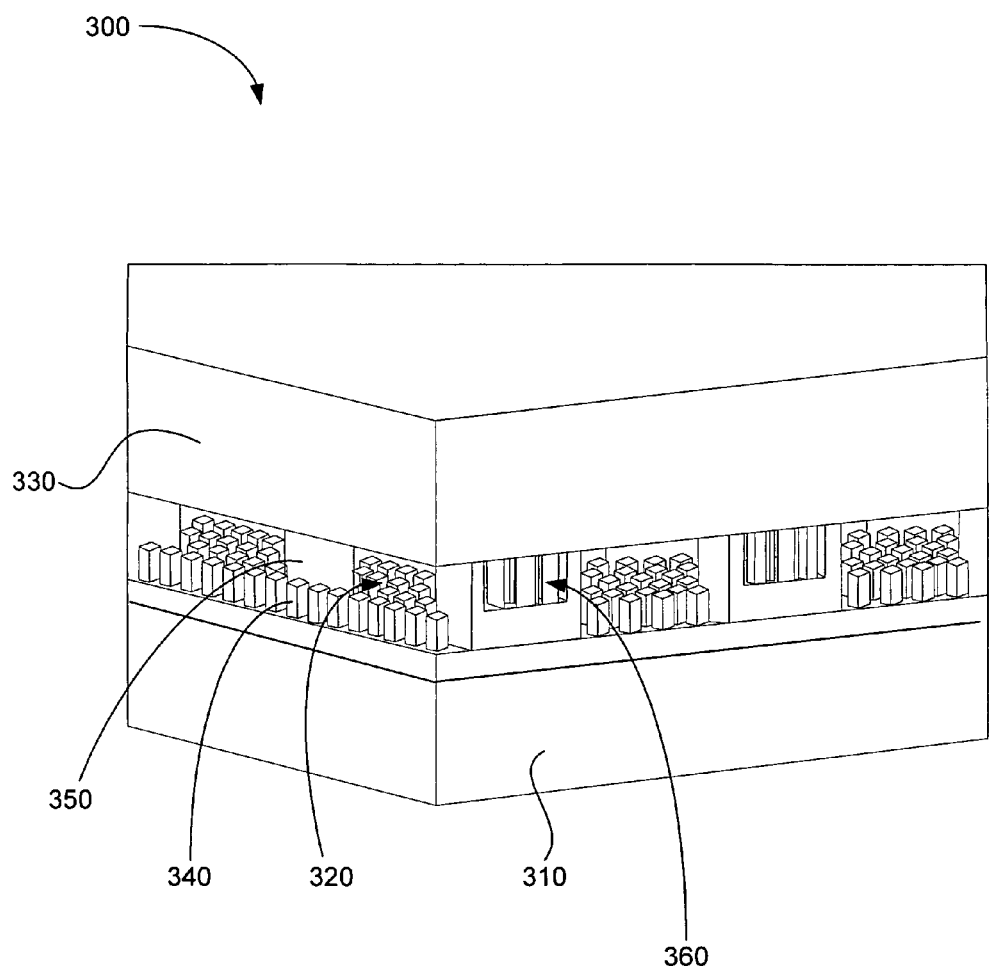
FIG. 3 illustrates a partial cross sectional view of a display device according to one exemplary embodiment.

FIG. 3 illustrates a partial cross sectional view of a flexible liquid crystal cell (300), according to one exemplary embodiment. The flexible liquid crystal (300) generally includes a first flexible substrate (310), a patterned member (320), and a second flexible substrate (330). The first and second flexible substrates (310, 330), may be of any suitable type, including generally transparent substrates. The flexible LC cell (300) shown and described with reference to FIG. 3 is a PABN-type flexible LC cell (300). The patterned member (320) may include several features, such as posts (340), spacers (350), and geometric adhesive patterns (360). As previously discussed, some or all of these features may be formed simultaneously through an embossing process. Liquid crystal fills a substantial portion of the space between the patterned member (320) and the second flexible substrate (330).

According to such a configuration, the posts (340) are individually isolated posts, which form the surface structure of the patterned member (320). The nematics within the liquid crystal arrange themselves around the posts (340), as will be discussed in more detail below. In a PABN configuration, the liquid crystal molecules are planarly anchored to the lower boundary of the cell, and homeotropically anchored to the upper boundary.

On the side of the posts (340) the molecules are planarly anchored with respect to the posts (340). Here the shape of each individual post (340) is the primary driving force behind the bi-stability. When liquid crystals are put in contact with the posts (340), the rod-like liquid crystals naturally align around the post in one of two directions: horizontally, or tilted upward in a spiral around the post. Applying an electric field switches their position from horizontal (a dark pixel) to tilted (a lit pixel). Both states are stable, so when the field is removed, the liquid crystals stay where they are. Accordingly, the posts (340) provide for bi-stable switching of the liquid crystal in the liquid crystal panel (300)

As previously discussed, it may be desirable to fill the LC panel (300) with the liquid crystal before sealing the second substrate (330). The geometric adhesive patterns (360) facilitate wet bonding of the second substrate. In particular, each geometric adhesive pattern (360) provides bonding due to its geometry, such as through capillary or van der Waals forces.

Figure 4:
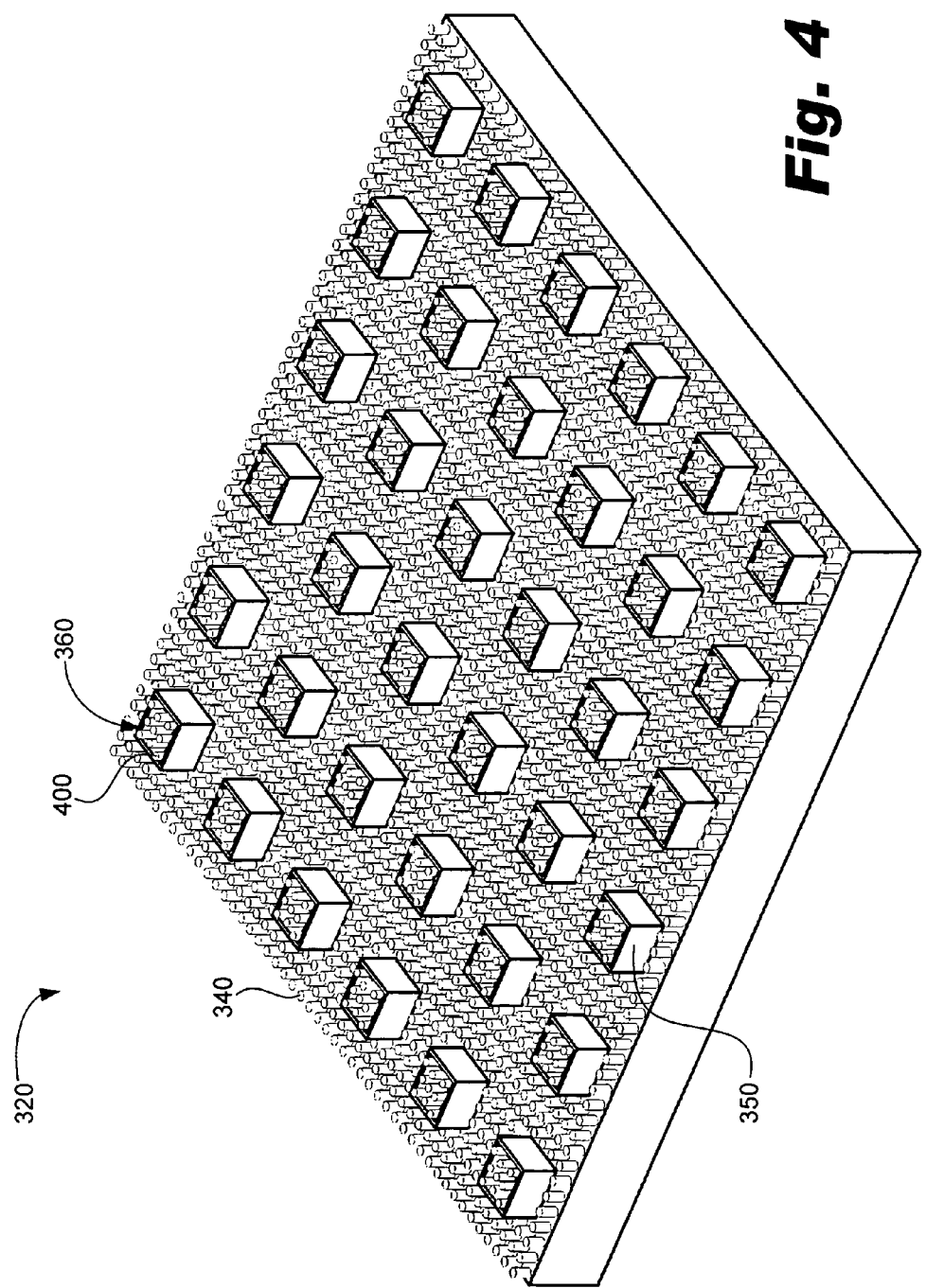
FIG. 4 illustrates a perspective view of a portion of a display device according to one exemplary embodiment.

The patterned member (320) is shown in more detail in FIG. 4. Several features, including the posts (340), the spacers (350), and the geometric adhesive portions (360) are shown in more detail in FIG. 4. FIG. 4 illustrates a perspective view of the LC panel (300) shown in FIG. 3 wherein the second substrate (330) has been removed. As discussed, the geometric adhesive portions (360) provide bonding due to their geometry. Each geometric adhesive includes a plurality of elongated members (400). The elongated members (400) may be formed as one of the features integrally formed by the embossing process described above. Further, each of the elongated members (400) may have dimensions of less than about 1 micron in width and less than about 3 micron pitch.

Figure 5:
FIG. 5 illustrates a schematic view of a display system according to one exemplary embodiment.
Figure 5:
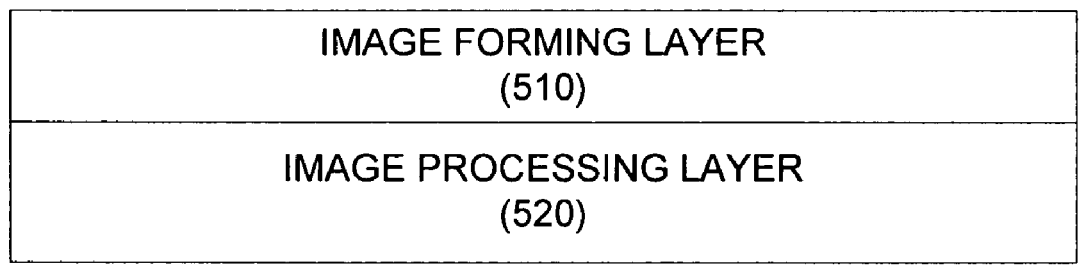

FIG. 5 illustrates a schematic view of a display system (500) according to one exemplary embodiment. As shown in FIG. 5, the display system (500) includes an image forming layer (510) and an image processing layer (520). According to the present exemplary embodiment, the image processing layer (520) includes circuitry related to the formation of an image in the image forming layer (510). Further, the image processing layer (520) may be bonded to the image forming layer (510) by geometric adhesives. The geometric adhesives may be coupled to either the image processing layer (520) and/or the image forming layer (510). The image forming layer (510) may include opposing substrates, which themselves may be bonded with geometric adhesives, as previously discussed.

In conclusion, the use of geometric adhesives allows small, consistent and predefined areas of contact between opposing surfaces. Further, geometric adhesives may be formed with a well-defined and uniform height. Geometric adhesives reduce the possibility that the bond between the two surfaces will be degraded by the presence of liquids, such as liquid crystal during a bonding process. Further, geometric adhesives allow for separate optimization of material compatibility such as not leaching or being attacked by the surrounding liquid environment and mechanical properties. The use of geometric adhesives may also reduce the dispensing and curing of adhesives in the presence of another liquid, such as liquid crystal. This in turn reduces the possibility the liquid crystal may become contaminated or that bubbles will be generated within the cell during the bonding process.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A liquid crystal device, comprising:
   a first substrate;
   a second substrate spaced apart from said first substrate;
   liquid crystal filling at least a portion of a space between said first and second substrates; and
   a number of geometric adhesive portions bonding said first and second substrate,
   in which said geometric adhesive portions comprise a number of elongated members, and
   in which said elongated members extend from said first substrate to said second substrate.

2. The device of claim 1, wherein said geometric adhesive portions are formed in an embossable material.

3. The device of claim 2, further comprising posts for post-aligned bi-stable devices and spacers, said posts and spacers being formed in said embossable material.

4. The device of claim 1, wherein said first and second substrates are substantially transparent.

5. The device of claim 1, wherein said first and second substrates are flexible substrates.

6. The device of claim 1, wherein said geometric adhesive portions include a plurality of elongated members, said elongated members having a width of less than about 1 micron and a pitch of less than about 3 microns.

7. The device of claim 1, wherein said geometric adhesive portions are used to bond components of an image forming layer.

8. The device of claim 1, wherein said geometric adhesive portions are used to bond an image processing layer to other parts of said device.

9. The device of claim 1, wherein said geometric adhesive portions comprise cured UV curable material.

10. A display, comprising:
    a display panel including a first substrate, a second substrate spaced apart from said first substrate, and a number of geometric adhesive portions bonding said first and second substrate,
    in which said first substrate is directly bonded to said second substrate by said geometric adhesive portions.

11. The display of claim 10, wherein said display panel comprises a liquid crystal panel.

12. The display of claim 10, wherein said display panel comprises a flexible display panel.

13. The display of claim 10, further comprising a light source coupled to said display panel.

14. A display system comprising:
    a display having a display panel including a first substrate, a second substrate spaced apart from said first substrate, and a number of geometric adhesive portions bonding said first substrate and said second substrate; and
    an image processing unit coupled to said display panel,
    in which said geometric adhesive portions bond said first substrate and said second substrate using only van der Waal force or capillary forces.

* * * * *